(12) United States Patent
Nocereto et al.

(10) Patent No.: US 10,184,376 B2
(45) Date of Patent: Jan. 22, 2019

(54) METHOD OF MANAGING A SELECTIVE CATALYTIC REDUCTION SYSTEM OF A MOTOR VEHICLE

(71) Applicant: GM GLOBAL TECHNOLOGY OPERATIONS LLC, Detroit, MI (US)

(72) Inventors: Mariano Nocereto, Turin (IT); Raffaello Ardanese, Bloomfield Hills, MI (US); Giovanni David, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 83 days.

(21) Appl. No.: 15/295,410

(22) Filed: Oct. 17, 2016

(65) Prior Publication Data

US 2017/0107879 A1   Apr. 20, 2017

(30) Foreign Application Priority Data

Oct. 16, 2015   (GB) .................................. 1518338.7

(51) Int. Cl.
*F01N 3/00*   (2006.01)
*F01N 3/20*   (2006.01)
*F01N 11/00*  (2006.01)

(52) U.S. Cl.
CPC .......... *F01N 3/208* (2013.01); *F01N 3/2066* (2013.01); *F01N 11/00* (2013.01); *F01N 2550/05* (2013.01); *F01N 2610/02* (2013.01); *F01N 2610/1406* (2013.01); *F01N 2610/148* (2013.01); *F01N 2900/1818* (2013.01); *Y02A 50/2325* (2018.01); *Y02T 10/24* (2013.01); *Y02T 10/47* (2013.01)

(58) Field of Classification Search
USPC ... 60/274, 276, 277, 286, 295, 297, 301.303
See application file for complete search history.

(56) References Cited

U.S. PATENT DOCUMENTS 8,671,660 B2 * 3/2014 Yasui ...................... F01N 3/206
                                                        60/277
8,769,935 B2 * 7/2014 Shaikh .................... F01N 3/208
                                                        60/286

(Continued)

OTHER PUBLICATIONS

Great Britain Patent Office, Great Britain Combined Search and Examination Report for Great Britain Application No. 1518338.7, dated Dec. 15, 2015.

*Primary Examiner* — Binh Q Tran
(74) *Attorney, Agent, or Firm* — Lorenz & Kopf, LLP (57) ABSTRACT

A method of managing a selective catalytic reduction system of a motor vehicle. During a first predetermined time period, a plurality of functionality checks of the sensor are performed for identifying if the sensor is able to provide a reliable measurement of the ammonia concentration. During the same first predetermined time period, a plurality of values of the ammonia concentration in the diesel exhaust fluid is measured by the sensor. A maintenance inducement strategy of the selective catalytic reduction system is activated if each of the values of the ammonia concentration measured during the first predetermined time period is smaller than a predetermined threshold value, and if each of the functionality checks of the sensor performed during the same first predetermined time period identifies that the sensor is able to provide a reliable measurement of the ammonia concentration.

13 Claims, 2 Drawing Sheets

(56) References Cited

U.S. PATENT DOCUMENTS

| | | | |
|---|---|---|---|
| 8,959,890 B2* | 2/2015 | Minezawa | F01N 3/208 60/277 |
| 2007/0079601 A1* | 4/2007 | Hirata | F01N 3/2066 60/286 |
| 2008/0087009 A1* | 4/2008 | Nishina | B01D 53/90 60/301 |
| 2011/0107812 A1 | 5/2011 | Kasahara | |
| 2013/0199158 A1* | 8/2013 | Henry | F01N 3/208 60/274 |
| 2015/0354429 A1 | 12/2015 | Thompson et al. | |

* cited by examiner

FIG.4

METHOD OF MANAGING A SELECTIVE CATALYTIC REDUCTION SYSTEM OF A MOTOR VEHICLE

CROSS-REFERENCE TO RELATED APPLICATION

This application claims priority to Great Britain Patent Application No. 1518338.7, filed Oct. 16, 2015, which is incorporated herein by reference in its entirety.

TECHNICAL FIELD

The present disclosure pertains to a method of managing a selective catalytic reduction (SCR) system of a motor vehicle.

BACKGROUND

It is known that some motor vehicles, such as passenger cars or trucks, may be provided with a SCR system for reducing the nitrogen oxides ($NO_x$) emitted by the engine of the motor vehicle. The SCR system generally includes an SCR catalyst which is disposed in an exhaust pipe of the engine to convert nitrogen oxides into diatonic nitrogen and water with the aid of a reducing agent, typically ammonia ($NH_3$). The ammonia may be obtained through the evaporation of an ammonia/water solution, usually referred as diesel exhaust fluid (DEF), which is supplied into the exhaust pipe by a DEF injector located upstream of the SCR catalyst. The DEF may be provided to the DEF injector by a DEF pump which is in fluid communication with a DEF tank installed on board of the motor vehicle.

In order to attain an efficient conversion of the $NO_x$, the concentration of ammonia in the DEF must be greater than a predetermined threshold value. For this reason, some of the strictest anti-pollution regulations require that the SCR systems are provided with a sensor for measuring the ammonia concentration of the DEF contained in the DEF tank, and with an electronic control unit (ECU) configured to activate a maintenance inducement strategy, if the ammonia concentration measured by the sensor is lower than the aforementioned threshold value.

The maintenance inducement strategy generally includes a number of measures that induce the driver of the motor vehicle to restore the efficiency of the SCR system by refilling the DEF tank. However, due to its functioning principle, the ammonia concentration sensor is able to perform a reliable measurement of the ammonia concentration only when it is completely immersed into the DEF. For this reason, when the dynamics of the motor vehicle (e.g. accelerations, deceleration, steering maneuvers, etc.) generates sloshing movements of the DEF that cause the ammonia concentration sensor to occasionally emerge from the DEF, the ECU may temporarily activate the maintenance inducement strategy, even if the SCR system is still perfectly able to convert the nitrogen oxides.

The frequency and the duration of these unnecessary activations of the maintenance inducement strategy usually increase as the DEF level into the DEF tank decreases and, when their impact on the drivability of the motor vehicle becomes unacceptable, the DEF tank must be refilled. However, it has been found that these events call for the refill of the DEF tank long before that the DEF tank is empty (in some cases when 6 liters of DEF are still contained in the DEF tank), with the result that the DEF tank results over dimensioned with respect of the real operating range of the SCR system.

SUMMARY

The present disclosure provides a method of managing a selective catalytic reduction system of a motor vehicle, wherein the selective catalytic reduction system includes a tank for containing a diesel exhaust fluid and a sensor located in the tank for measuring an ammonia concentration in the diesel exhaust fluid. During a first predetermined time period, a plurality of functionality checks of the sensor are performed for identifying if the sensor is able to provide a reliable measurement of the ammonia concentration. During the same first predetermined time period, a plurality of values of the ammonia concentration in the diesel exhaust fluid are measured by the sensor. A maintenance inducement strategy of the selective catalytic reduction system is activated if each of the values of the ammonia concentration measured during the first predetermined time period is smaller than a predetermined threshold value, and if each of the functionality checks of the sensor performed during the same first predetermined time period identifies that the sensor is able to provide a reliable measurement of the ammonia concentration. As a result, the maintenance inducement strategy is not immediately activated as soon as the sensor measures a low value of the ammonia concentration in the DEF, but is activated only if this condition has been verified for a certain time period (usually referred as to "debouncing time"), during which the sensor was also actually able to provide a reliable measurement of the ammonia concentration.

If these conditions are not satisfied, for example because during the debouncing time a sloshing movement of the DEF has caused the sensor to temporarily emerge from the DEF, the maintenance inducement strategy is not immediately activated, thereby reducing the number of unnecessary activations of such strategy and thus improving the drivability of the motor vehicle. As a consequence, also the DEF tank needs to be refilled only when the quantity of DEF contained in the DEF tank is actually quite small, thereby achieving a better exploitation of its capacity.

According to an aspect of the method, each functionality check may include testing if the sensor is immersed in the diesel exhaust fluid contained in the tank and identifying that the sensor is able to provide a reliable measurement of the ammonia concentration, if the test yields that the sensor is immersed in the diesel exhaust fluid contained in the tank. This aspect provides a simple and effective solution for ascertain if the measurements made by the sensor are reliable or not.

According to another aspect of the method, the maintenance inducement strategy may include the step of limiting the performance of the motor vehicle. This solution has the effect of causing a strong inducement to restore the efficiency of the SCR system.

According to still another aspect, the method may also include performing, during a second predetermined time period, a plurality of functionality checks of the sensor, measuring, during the same second predetermined time period, a plurality of values of the ammonia concentration in the diesel exhaust fluid by the sensor, and deactivating the maintenance inducement strategy of the selective catalytic reduction system, if each of the values of the ammonia concentration measured during the second predetermined time period is equal to or larger than the predetermined threshold value, and if each of the functionality checks performed during the same second predetermined time period identifies that the sensor is capable to provide a reliable measurement of the ammonia concentration. As a result, the maintenance inducement strategy is not immediately deactivated as soon as the sensor measures a proper value of the ammonia concentration in the DEF, but is deactivated only if this condition has been verified for a certain time period (debouncing time), during which the sensor was also actually able to provide a reliable measurement of the ammonia concentration. In this way, the proposed method prevents that the maintenance inducement strategy is temporarily deactivated just because a sloshing movement of the DEF in the tank has caused the sensor to be temporarily covered by the fluid.

According to another aspect, the method may also include performing, during a third predetermined time period, a plurality of functionality checks of the sensor, and identifying a malfunctioning of the sensor, if each of the functionality checks performed during the third predetermined time period identifies that the sensor is not able to provide a reliable measurement of the ammonia concentration. This aspect provides a reliable criterion for identifying a sensor malfunctioning. Indeed, if the sensor has been unable to provide a reliable measurement of the ammonia concentration for the aforesaid time period, it cannot be due to a sloshing movement of the DEF in the DEF tank.

According to an aspect, the method may also include measuring a value of a quantity of the diesel exhaust fluid contained in the tank, and preventing the identification of the sensor malfunctioning, if the measured quantity value is smaller than a predetermined threshold value thereof. This aspect has the effect of preventing the identification of the malfunctioning when the DEF tank is empty or almost empty, because under this condition it is very likely that the sensor is not immersed in the DEF, so that it may be unable to provide a reliable measurement of the ammonia concentration irrespective of any malfunctioning.

According to still another aspect, the method may also include measuring a value of a temperature of the diesel exhaust fluid, and preventing the identification of the sensor malfunctioning, if the measured temperature value is smaller than a predetermined threshold value thereof. This aspect has the effect of preventing the identification of the malfunctioning when the temperature is very low, because under this condition the DEF in the DEF tank can be frozen and the sensor may be thus unable to provide a reliable measurement of the ammonia concentration irrespective of any malfunctioning.

According to another aspect, the method may also include measuring a value of a speed of the motor vehicle, and preventing the identification of the sensor malfunctioning, if the measured speed value is smaller than a predetermined threshold value thereof. This aspect has the effect of preventing the identification of the malfunctioning of the sensor when the motor vehicle is moving slowly, because under this condition the sloshing movements of the DEF in the DEF tank may be very relevant and the sensor may be unable to provide a reliable measurement of the ammonia for a relatively long time irrespective of any malfunctioning.

According to another aspect, the method may also include testing a proper functioning of a pump for pumping the diesel exhaust fluid from the tank to an injector, testing a proper functioning of the injector, and preventing the identification of the sensor malfunctioning, if the pump or the injector are not properly functioning. This aspect has the effect of preventing the identification of the malfunctioning of the sensor when other key components of the SCR system have been already tested to be malfunctioning.

According to another aspect, the method may also include activating the maintenance inducement strategy if the malfunctioning of the sensor is identified. This solution has the effect of signaling the malfunctioning to the driver and inducing him to take the necessary countermeasures.

Another embodiment of the present solution provides a computer program for managing a selective catalytic reduction system of a motor vehicle, wherein the selective catalytic reduction system includes a tank for containing a diesel exhaust fluid and a sensor located in the tank for measuring an ammonia concentration in the diesel exhaust fluid, and wherein the computer program includes program-code provided for carrying out, when run on a computer, the steps of the method disclosed above. The present solution may be also embodied in the form of a computer program product including a carrier on which the computer program, and in the form of an electromagnetic signal modulated to carry a sequence of data bits which represents the computer program.

Another embodiment of the solution provides a motor vehicle that includes a selective catalytic reduction system provided with a tank for containing a diesel exhaust fluid and with a sensor located in the tank for measuring an ammonia concentration in the diesel exhaust fluid, and an electronic control unit configured to carry out the method disclosed above.

Still another embodiment of the solution provides an apparatus for managing a selective catalytic reduction system of a motor vehicle, wherein the selective catalytic reduction system includes a tank for containing a diesel exhaust fluid and a sensor located in the tank for measuring an ammonia concentration in the diesel exhaust fluid. The apparatus is configured to perform a plurality of functionality checks of the sensor during a first predetermined time period for identifying if the sensor is able to provide a reliable measurement of the ammonia concentration, to measure a plurality of values of the ammonia concentration in the diesel exhaust fluid during the same first predetermined time period by the sensor, to activate a maintenance inducement strategy of the selective catalytic reduction system, if each of the values of the ammonia concentration measured during the first predetermined time period is smaller than a predetermined threshold value, and if each of the functionality checks of the sensor performed during the same first predetermined time period identifies that the sensor is able to provide a reliable measurement of the ammonia concentration. This embodiment achieves basically the same effects of the method disclosed above, in particular that of reducing the number of unnecessary activations of the maintenance inducement strategy and thus improving the drivability of the motor vehicle and achieving a better exploitation of the DEF tank capacity.

According to an aspect of the apparatus, the apparatus is configured to test if the sensor is immersed in the diesel exhaust fluid contained in the tank, and identify that the sensor is able to provide a reliable measurement of the ammonia concentration, if the test yields that the sensor is immersed in the diesel exhaust fluid contained in the tank. This aspect provides a simple and effective solution for ascertain if the measurements made by the sensor are reliable or not.

According to an aspect of the apparatus, the apparatus is configured to limit the performance of the motor vehicle for activating the maintenance inducement strategy. This solution has the effect of causing a strong inducement to restore the efficiency of the SCR system.

According to another aspect, the apparatus is further configured to perform a plurality of functionality checks of the sensor during a second predetermined time period, to measure a plurality of values of the ammonia concentration in the diesel exhaust fluid by the sensor during the same second predetermined time period, and to deactivate the maintenance inducement strategy of the selective catalytic reduction system, if each of the values of the ammonia concentration measured during the second predetermined time period is equal to or larger than the predetermined threshold value, and if each of the functionality checks performed during the same second predetermined time period identifies that the sensor is capable to provide a reliable measurement of the ammonia concentration. As a result, the apparatus prevents that the maintenance inducement strategy is temporarily deactivated just because a sloshing movement of the DEF in the tank has caused the sensor to be temporarily covered by the fluid.

According to another aspect, the apparatus is further configured to perform a plurality of functionality checks of the sensor during a third predetermined time period, and to identify a malfunctioning of the sensor, if each of the functionality checks performed during the third predetermined time period identifies that the sensor is not able to provide a reliable measurement of the ammonia concentration. This aspect provides a reliable criterion for identifying a sensor malfunctioning.

According to an aspect, the apparatus may be configured to measure a value of a quantity of the diesel exhaust fluid contained in the tank, and to prevent the identification of the sensor malfunctioning, if the measured quantity value is smaller than a predetermined threshold value thereof. This aspect has the effect of preventing the identification of the malfunctioning when the DEF tank is empty or almost empty.

According to still another aspect, the apparatus may additionally be configured to measure a value of a temperature of the diesel exhaust fluid, and to prevent the identification of the sensor malfunctioning, if the measured temperature value is smaller than a predetermined threshold value thereof. This aspect has the effect of preventing the identification of the malfunctioning when the temperature is very low.

According to another aspect, the apparatus may additionally be configured to measure a value of a speed of the motor vehicle, and to prevent the identification of the sensor malfunctioning, if the measured speed value is smaller than a predetermined threshold value thereof. This aspect has the effect of preventing the identification of the malfunctioning of the sensor when the motor vehicle is moving slowly.

According to another aspect, the apparatus may additionally be configured to test a proper functioning of a pump for pumping the diesel exhaust fluid from the tank to an injector, to test a proper functioning of the injector, and to prevent the identification of the sensor malfunctioning, if the pump or the injector are not properly functioning. This aspect has the effect of preventing the identification of the malfunctioning of the sensor when other key components of the SCR system have been already tested to be malfunctioning.

According to another aspect, the apparatus may be configured to activate the maintenance inducement strategy if the malfunctioning of the sensor is identified. This solution has the effect of signaling the malfunctioning to the driver and inducing him to take the necessary countermeasures.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
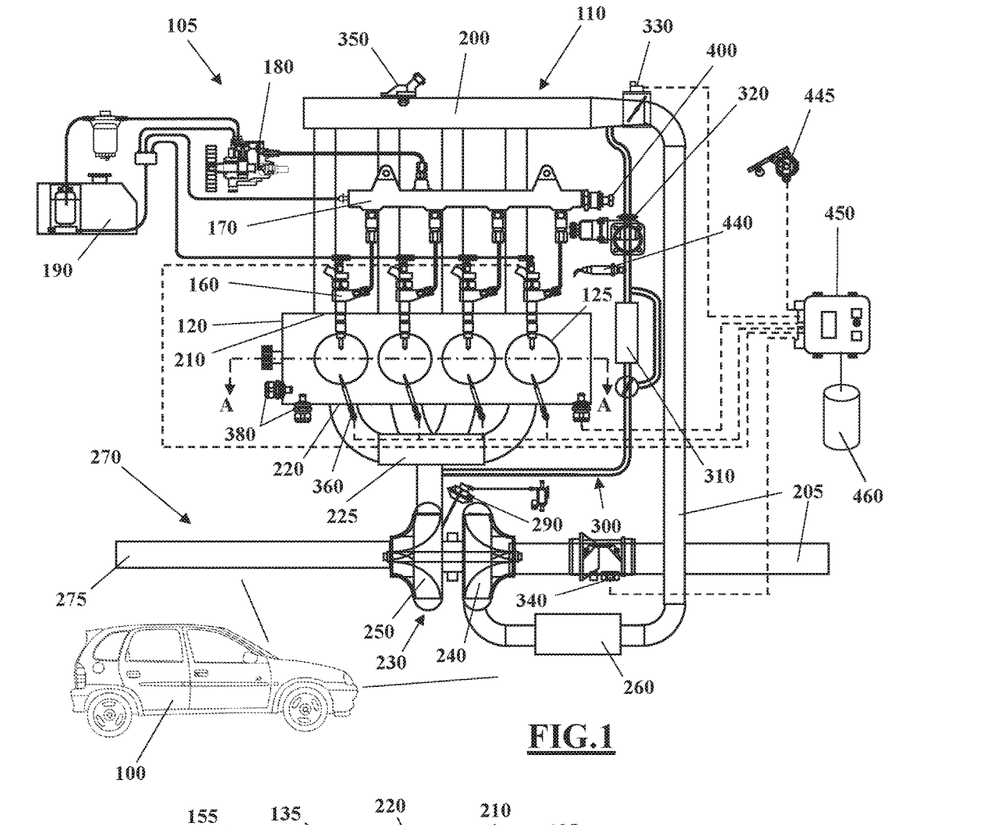
FIG. 1 shows a motor vehicle embodying an automotive system.
Figure 2:
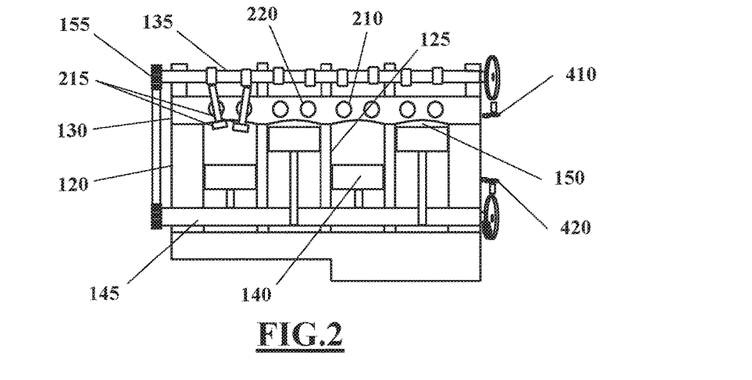
FIG. 2 is a cross-section of an internal combustion engine belonging to the automotive system of FIG. 1.

Some embodiments may include a motor vehicle 100 (e.g. a passenger car) that embodies an automotive system 105, as shown in FIGS. 1 and 2. The automotive system 105 includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gases causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 255 arranged to move the vanes to alter the flow of the exhaust gases through the turbine 250. In other embodiments, the turbocharger 230 may be fixed geometry and/or include a waste gate.

Figure 3:
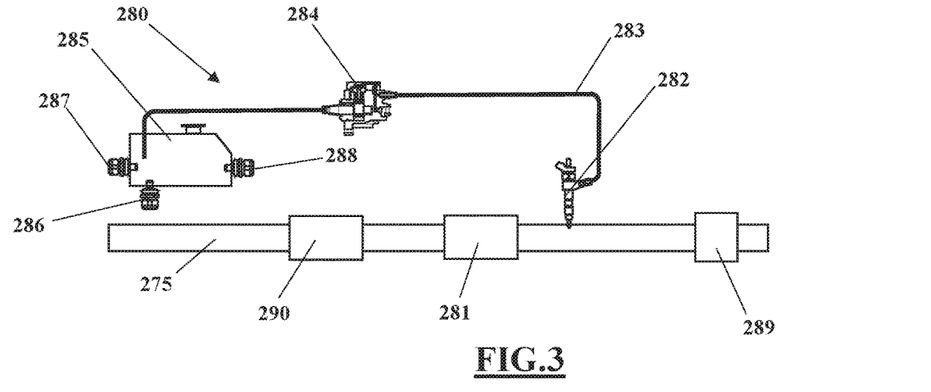
FIG. 3 is a schematic representation of an SCR system belonging to the automotive system of FIG. 1.

The exhaust gases exit the turbine 250 and are directed into an exhaust system 270. The exhaust system 270 may include an exhaust pipe 275 having one or more exhaust aftertreatment devices, as shown in FIG. 3. The aftertreatment devices may be any device configured to change the composition of the exhaust gases. In the present example, the aftertreatment devices include a selective catalytic reduction (SCR) system 280 that includes an SCR catalyst 281 (also referred as SCR converter) which is disposed in the exhaust pipe 275 for converting the nitrogen oxides contained in the exhaust gas into diatonic nitrogen and water. The conversion is operated with the aid of a reducing agent, typically ammonia ($NH_3$). The ammonia is provided in the form of a solution of water and ammonia, also referred as diesel exhaust fluid (DEF), which is injected into the exhaust pipe 275 by a DEF injector 282 disposed upstream of the SCR catalyst 281. When the DEF mixes with the hot exhaust gas, the water vaporizes and the ammonia is absorbed and stored into the SCR catalyst 281. The DEF is provided to the DEF injector 282 from a supply conduit 283, which is in fluid communication with a DEF pump 284 that increases the pressure of the DEF received from a DEF tank 285. The DEF pump 285 may be actuated by an electric motor. The SCR system 280 may also include a temperature sensor 286 associated to the DEF tank 285 for measuring the temperature of the DEF contained therein.

The SCR system 280 may also include a sensor 287, usually referred as to DEF quality sensor, which is associated to the DEF tank 285 for measuring the concentration of ammonia in the DEF that is contained in the DEF tank 285. In particular, the ammonia concentration sensor 287 may be configured to emit sound waves at the frequency of the ultrasounds into the DEF tank 285, to measure a propagation speed of these ultrasounds into the DEF contained in the DEF tank 285 and to calculate the ammonia concentration in the DEF as a function of the measured propagation speed, possibly taking into account also the temperature of the DEF as measured by the temperature sensor 286. Due to this functioning principle, in order to provide a reliable measurement of the ammonia concentration, the sensor 287 needs to be completely immersed in the DEF contained into the DEF tank 285. The ammonia concentration sensor 287 may thus include electronic means configured to set a flag field R to "false" if the sensor 287 is not completely immersed in the DEF, thereby indicating that the sensor is unable to perform a reliable measurement. By way of example, the flag field R may be set to "false" any time that the value of the ammonia concentration measured by the sensor 287 deviates so much from an expected value thereof, that it clearly means that the sensor 287 is no longer immersed in the DEF. When conversely the sensor 287 is immersed in the DEF, the aforementioned electronic mean may set the flag field R to "true." In some embodiments, the SCR system 280 may also include a level sensor 288 associated to the DEF tank 285 for measuring a quantity of DEF contained therein.

The aftertreatment devices may further include an oxidation catalyst 289 disposed in the exhaust pipe 275 upstream of the DEF injector 282, and a particulate filter 290 disposed in the exhaust piper 275 downstream of the SCR catalyst 281. Other embodiments may further include an exhaust gas recirculation (EGR) system 300, as shown in FIG. 1, coupled between the exhaust manifold 225 and the intake manifold 200. The EGR system 300 may include an EGR cooler 310 to reduce the temperature of the exhaust gases in the EGR system 300 and an EGR valve 320 to regulate a flow of exhaust gases in the EGR system 300.

The automotive system 105 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, the DEF temperature sensor 286, the ammonia concentration sensor 287, the DEF level sensor 288, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the DEF injector 282, the DEF pump 284, the throttle body 330, the EGR Valve 320, the VGT actuator 255, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 105 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 105 may have a different type of processor to provide the electronic logic, e.g. an embedded controller, an onboard computer, or any processing module that might be deployed in the vehicle.

With regard to the instant disclosure, the ECU 450 may be configured to implement a method of managing the SCR system 280 in such a way to prevent that the motor vehicle 100 can be used when the SCR system 280 is unable to properly convert the nitrogen oxides.

Figure 4:
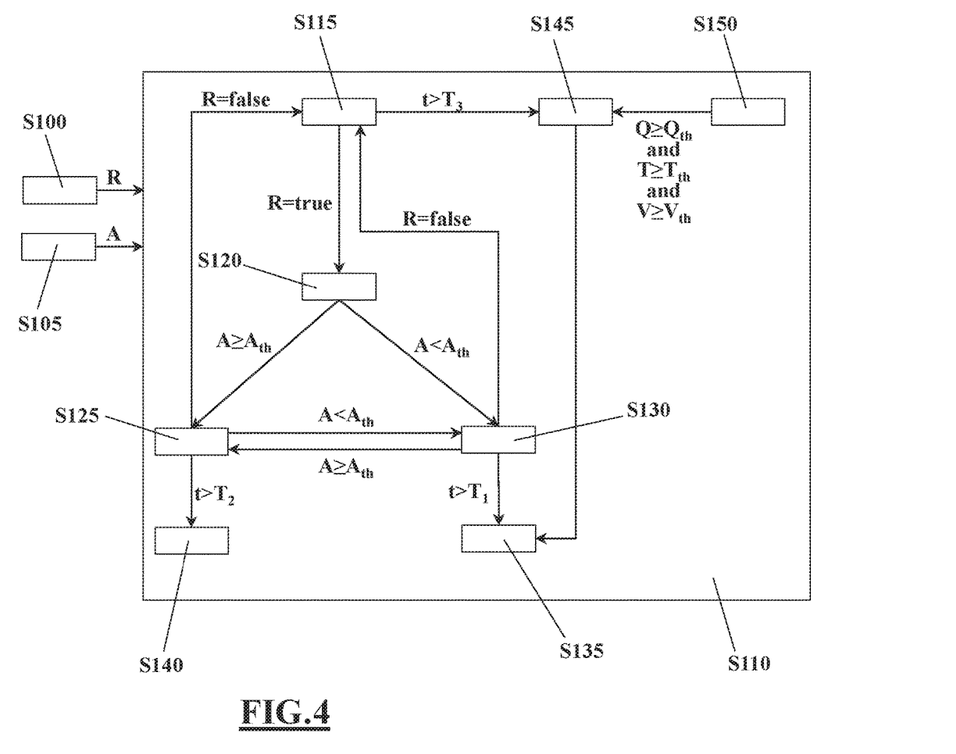
FIG. 4 is a flowchart of a method for managing the SCR system of FIG. 3.

As shown in FIG. 4, this managing method may provide for the ECU 450 to repeatedly perform over time a functionality check of the sensor 287, which is configured to identify whether the sensor 287 is actually able to provide a reliable measurement of the ammonia concentration in the DEF or not (block S100). By way of example, the functionality check of the sensor 287 may simply provide for the ECU 450 to check if the flag field R generated by the electronic means of the sensor 287 is set to "true" or to "false." Contemporaneously, the managing method may generally provide for the ECU 450 to continuously (i.e. repeatedly) measuring over time a value A of the ammonia concentration in the DEF, by the sensor 287 (block S105).

The results yielded by the monitoring of the sensor reliability (i.e. the values of the flag field R) and the values A measured with the sensor 287 may be used by the ECU 450 to manage the SCR system 280 according to a finite-state machine (block S110), as described hereinafter. Any time that the value of the flag field R is "false", the ECU 450 may be configured to set a status of the sensor 287 to "not ready" (block S115), thereby indicating that the sensor is unable (not ready) to perform a reliable measurement of the ammonia concentration.

Starting from this condition, as soon as the flag field R is switched to the "true" value, for example because the sensor 287 is found to be effectively immersed in the DEF, the ECU 450 may be configured to switch the status of the sensor 287 from "not-ready" to "ready" (block S120).

While the sensor 287 is in the "ready" status, the ECU 450 may be configured to measure with the sensor 287 a first value A of the ammonia concentration in the DEF contained in the DEF tank 285 and to compare it with a threshold value $A_{th}$ thereof. The threshold value $A_{th}$ of the ammonia concentration may be a calibration value below which the DEF is unable to prompt an effective conversion of the nitrogen oxides in the SCR system 280. This threshold value $A_{th}$ generally depends on the characteristics of the ICE 110, and may vary for example from a minimum of 22% for small engines to a maximum of 28% for bigger engines.

If the measured value A of the ammonia concentration is equal to or larger than the predetermined threshold value $A_{th}$, the ECU 450 may be configured to switch the status of the sensor 287 from "ready" to "positive" (block S125), thereby indicating that the sensor 287 is measuring a proper composition of the DEF. Once the sensor 287 has entered the "positive" status, the ECU 450 may be configured to measure over time additional values A of the ammonia concentration in the DEF, always by the sensor 287. As long as the measured values A of the ammonia concentration are equal to or larger than the threshold value $A_t$ and the value of the flag field R remains "true" (for example because the sensor 287 is still immersed in the DEF), the ECU 450 may be configured to keep the sensor 287 in the "positive" status.

However, if it happens that the sensor 287 switches the flag field R to "false" indicating that the sensor 287 is no more covered by DEF, for example because of a sloshing movement of the DEF into the DEF tank 285, the ECU 450 may be configured to immediately switch the status of the sensor 287 from "positive" back to "not ready" (block S115) and to continue the management from there. On the other hand, if it happens that one of the ammonia concentration value A measured by the sensor 287 gets smaller than the threshold value $A_{th}$, the ECU 450 may be configured to immediately switch the status of the sensor 287 from "positive" to "negative" (block S130), thereby indicating that the sensor 287 is measuring an improper composition of the DEF.

Once the sensor 287 has entered the "negative" status, the ECU 450 may be configured to measure over time additional values A of the ammonia concentration in the DEF, always by the sensor 287. As long as the measured values A of the ammonia concentration are smaller than the threshold value $A_{th}$ and the value of the flag field R remains "true" (for example because the sensor 287 is still immersed in the DEF), the ECU 450 may be configured to keep the sensor 287 in the "negative" status. Also in this case, if it however happens that the sensor 287 switches the flag field R to "false" indicating that the sensor 287 is no more covered by DEF, for example because of a sloshing movement of the DEF into the DEF tank 285, the ECU 450 may be configured to immediately switch the status of the sensor 287 from "negative" back to "not ready" (block S115) and to continue the management from there.

On the other hand, if it happens that one of the ammonia concentration value A measured by the sensor 287 gets equal to or larger than the threshold value $A_{th}$, the ECU 450 may be configured to immediately switch the status of the sensor 287 from "negative" back to "positive" (block S125). Otherwise, if the sensor 287 stays in the "negative" status (block S130) for a time t which is longer than a first predetermined time period $T_1$ (usually referred as to debouncing time), the ECU 450 may be configured to conclude that the composition of the DEF is actually improper and to activate a maintenance inducement strategy of the SCR system 280 (block S135). The first predetermined time period $T_1$ may be a calibration parameter and may be for example a few seconds long.

The inducement strategy may include measures aimed to induce the driver of the motor vehicle 100 to restore the efficiency of the SCR system 280, for example by refilling the DEF tank 285 with a DEF having the right composition. These measures may include, but are not limited to, the activation of a warning light on a dashboard of the motor vehicle 100 and/or the adoption of a low-performance operating mode of the ICE 110 that is able to limit the performance of the motor vehicle 100.

While the maintenance inducement strategy is underway, the ECU 450 may be configured to keep on monitoring the value of the flag field R and measuring with the sensor 287 the value A of the ammonia concentration in the DEF. As soon as the value A gets larger than the threshold value $A_{th}$, for example because the driver has refilled the DEF tank 285, the ECU 450 may be configured to switch the status of the sensor 287 from "negative" back to "positive" (block S125).

At this point, if the sensor 287 stays in the "positive" status for a time t which is longer than a second predetermined time period $T_2$ (another debouncing time), the ECU 450 may be configured to conclude that the composition the DEF is now correct and to deactivate the maintenance inducement strategy (block S140). Also the second predetermined time period $T_2$ may be a calibration parameter and may be for example a few seconds long. By way of example the first and the second predetermined time periods $T_1$ and $T_2$ may be equal. Once the maintenance inducement strategy has been deactivated, the ECU 450 may be configured to continue managing the SCR system 280 according to the same procedure explained above.

At any stage during this procedure, if it happens that the sensor 287 stays in the "not ready" status (block S100) for a time t which is longer than a third predetermined time period $T_3$ (another debouncing time), the ECU 450 may be also configured to identify a malfunctioning of the sensor 287 (block S145). The third predetermined time period $T_3$ may be another calibration parameter and may be for example a few seconds long. By way of example, the third predetermined time period $T_3$ may be equal to the first predetermined time period $T_1$.

However, the identification of the malfunctioning of the sensor 287 may be subordinated to one or more additional conditions, which have to be tested (block S150) while the sensor 287 is in the "not ready" status. One of these tests may prescribe for the ECU 450 to measure a value Q of a quantity of DEF contained in the DEF tank 285 and to compare the measured quantity value Q with a threshold value $Q_{th}$ thereof. The DEF quantity value Q may be measured for example by the level sensor 288. The threshold value $Q_{th}$ of the DEF quantity may be a calibration parameter that indicates that the DEF tank 285 is empty or almost empty. If the measured DEF quantity value Q is smaller than the threshold value $Q_{th}$, the ECU 450 may be configured to prevent the identification of the malfunctioning, because under this condition it is very likely that the sensor 287 is not immersed in the DEF and the sensor 287 is thus unable to provide a reliable measurement of the ammonia concentration irrespective of any malfunctioning.

Another of the aforementioned tests may prescribe for the ECU 450 to measure a value T of a temperature of the DEF into the DEF tank 285 and to compare the measured temperature value T with a predetermined threshold value $T_{th}$ thereof. The DEF temperature value T may be measured by the temperature sensor 286. The threshold value $T_{th}$ of the DEF temperature may be the value corresponding to the melting point of the DEF. If the measured DEF temperature value T is smaller than the threshold value $T_{th}$, the ECU 450 may be configured to prevent the identification of the malfunctioning, because under this condition it is very likely that the DEF is frozen and the sensor 287 is thus unable to provide a reliable measurement of the ammonia concentration irrespective of any malfunctioning.

Another of the aforementioned tests may prescribe for the ECU 450 to measure a value V of a speed of the motor vehicle 100 and to compare the measured speed value V with a predetermined threshold value thereof $V_{th}$. The value V of the motor vehicle speed may be measured by a speedometer (not shown). The threshold value $V_{th}$ of the motor vehicle speed may be a calibration value. If the measured speed value V is smaller than the predetermined threshold value $V_{th}$ thereof, the ECU 450 may be configured to prevent the identification of the malfunctioning, because under this condition the sloshing movements of the DEF in the DEF tank 285 may be very relevant and sensor 287 may be unable to provide a reliable measurement of the ammonia for a relatively long time irrespective of any malfunctioning.

While the sensor 287 is in the "not ready" status, the ECU 450 may be also configured to test a proper functioning of the DEF pump 284, to test a proper functioning of the DEF injector 282 and to prevent the identification of the sensor malfunctioning, if the DEF pump 284 and/or the DEF injector 282 is not properly functioning, because in this case the hydraulic circuit of the SCR system is not running.

As a consequence, the ECU 450 may be configured to identify the malfunctioning of the sensor 287 (block S145) only if all the following conditions are satisfied: the sensor 287 has been kept in the "not ready" status for more than the third predetermined time period $T_3$, the measured DEF quantity value Q is equal to or larger than the threshold value $Q_{th}$ thereof, the measured DEF temperature value T is equal to or larger than the threshold value $T_{th}$ thereof, the measured speed value V is equal to or larger than the predetermined threshold value $V_{th}$ thereof, and both the DEF pump 284 and the DEF injector 282 are properly functioning. If the malfunctioning of the sensor 287 is identified, the ECU 450 may be configured to directly activate the maintenance inducement strategy (block S135), without actually measuring the ammonia concentration.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for controlling an internal combustion engine associated with a selective catalytic reduction system of a motor vehicle, wherein the selective catalytic reduction system includes a tank for containing a diesel exhaust fluid and a sensor located in the tank for measuring an ammonia concentration in the diesel exhaust fluid, and the method comprises:
performing, by a processor, a plurality of functionality checks of the sensor during a first predetermined time period for identifying if the sensor is able to provide a reliable measurement of the ammonia concentration;
measuring, by the processor, a plurality of values of the ammonia concentration in the diesel exhaust fluid during the same first predetermined time period with the sensor;
activating, by the processor, a maintenance inducement strategy of the selective catalytic reduction system, if each of the values of the ammonia concentration measured during the first predetermined time period is smaller than a predetermined threshold value, and if each of the plurality of functionality checks of the sensor performed during the same first predetermined time period identifies that the sensor is able to provide a reliable measurement of the ammonia concentration;
performing, by the processor, a plurality of functionality checks of the sensor, during a second predetermined time period;
measuring, by the processor, a plurality of values of the ammonia concentration in the diesel exhaust fluid during the same second predetermined time period with the sensor;
deactivating, by the processor, the maintenance inducement strategy of the selective catalytic reduction system, if each of the values of the ammonia concentration measured during the second predetermined time period is equal to or larger than the predetermined threshold value, and if each of the functionality checks performed during the same second predetermined time period identifies that the sensor is capable to provide a reliable measurement of the ammonia concentration; and generating, by the processor, output signals for controlling the internal combustion engine based on the measurement of the ammonia concentration.

2. The method according to claim 1, wherein each functionality check comprises:
testing, by the processor, if the sensor is immersed in the diesel exhaust fluid contained in the tank; and
identifying, by the processor, that the sensor is able to provide a reliable measurement of the ammonia concentration, if the test yields that the sensor is immersed in the diesel exhaust fluid contained in the tank.

3. The method according to claim 1, wherein the maintenance inducement strategy comprises limiting the performance of the motor vehicle.

4. The method according to claim 1, comprising:
performing, by the processor, a plurality of functionality checks of the sensor during a third predetermined time period; and
identifying, by the processor, a malfunctioning of the sensor, if each of the functionality checks performed during the third predetermined time period identifies that the sensor is not able to provide a reliable measurement of the ammonia concentration.

5. The method according to claim 4, further comprising:
measuring, by the processor, a value of a quantity of the diesel exhaust fluid contained in the tank; and
preventing, by the processor, the identification of the sensor malfunctioning, if the measured quantity value is smaller than a predetermined threshold value thereof.

6. The method according to claim 4, further comprising:
measuring, by the processor, a value of a temperature of the diesel exhaust fluid; and
preventing, by the processor, the identification of the sensor malfunctioning, if the measured temperature value is smaller than a predetermined threshold value thereof.

7. The method according to claim 4, further comprising:
measuring, by the processor, a value of a speed of the motor vehicle; and
preventing, by the processor, the identification of the sensor malfunctioning, if the measured speed value is smaller than a predetermined threshold value thereof.

8. The method according to claim 4, further comprising:
testing, by the processor, a proper functioning of a pump for pumping the diesel exhaust fluid from the tank to an injector;
testing, by the processor, a proper functioning of the injector; and
preventing, by the processor, the identification of the sensor malfunctioning, if the pump or the injector are not properly functioning.

9. The method according to claim 4, further comprising activating, by the processor, the maintenance inducement strategy if the malfunctioning of the sensor is identified.

10. A system for controlling an internal combustion engine associated with a selective catalytic reduction system comprising:
a tank for containing a diesel exhaust fluid;
a sensor for measuring an ammonia concentration in the diesel exhaust fluid; and
an electronic control unit having a processor configured to:
perform a plurality of functionality checks of the sensor during a first predetermined time period for identifying if the sensor is able to provide a reliable measurement of the ammonia concentration;
receive a plurality of values of the ammonia concentration in the diesel exhaust fluid during the same first predetermined time period from the sensor;
activate a maintenance inducement strategy of the selective catalytic reduction system, if each of the values of the ammonia concentration measured during the first predetermined time period is smaller than a predetermined threshold value, and if each of the plurality of functionality checks of the sensor performed during the same first predetermined time period identifies that the sensor is able to provide a reliable measurement of the ammonia concentration;
perform a plurality of functionality checks of the sensor, during a second predetermined time period;
receive a plurality of values of the ammonia concentration in the diesel exhaust fluid during the same second predetermined time period from the sensor; and
deactivate the maintenance inducement strategy of the selective catalytic reduction system, if each of the values of the ammonia concentration measured during the second predetermined time period is equal to or larger than the predetermined threshold value, and if each of the functionality checks performed during the same second predetermined time period identifies that the sensor is capable to provide a reliable measurement of the ammonia concentration.

11. The selective catalytic reduction system according to claim 10, wherein the processor of the electronic control unit is further configured to:
test if the sensor is immersed in the diesel exhaust fluid contained in the tank; and
identify that the sensor is able to provide a reliable measurement of the ammonia concentration, if the test yields that the sensor is immersed in the diesel exhaust fluid contained in the tank.

12. The selective catalytic reduction system according to claim 10, wherein the processor of the electronic control unit is further configured to limit the performance of the motor vehicle.

13. The selective catalytic reduction system according to claim 10, wherein the processor of the electronic control unit is further configured to:
perform a plurality of functionality checks of the sensor during a third predetermined time period; and
identify a malfunctioning of the sensor, if each of the functionality checks performed during the third predetermined time period identifies that the sensor is not able to provide a reliable measurement of the ammonia concentration.

* * * * *